(12) United States Patent
Fujita et al.

(10) Patent No.: US 7,845,733 B2
(45) Date of Patent: Dec. 7, 2010

(54) SEAT

(75) Inventors: Etsunori Fujita, Hiroshima-Ken (JP); Kazuyoshi Chizuka, Hiroshima-Ken (JP); Seiji Kawasaki, Hiroshima-Ken (JP); Yumi Ogura, Hiroshima-Ken (JP); Yasuhide Takata, Hiroshima-Ken (JP)

(73) Assignee: Delta Tooling Co., Ltd., Hiroshima-Ken (JP)

( * ) Notice: Subject to any disclaimer, the term of this patent is extended or adjusted under 35 U.S.C. 154(b) by 113 days.

(21) Appl. No.: 11/485,729

(22) Filed: Jul. 13, 2006

(65) Prior Publication Data
US 2007/0013217 A1 Jan. 18, 2007

(30) Foreign Application Priority Data
Jul. 14, 2005 (JP) ............................... 2005-205342

(51) Int. Cl.
*A47C 7/02* (2006.01)
(52) U.S. Cl. ...................... 297/452.13; 297/452.56; 297/452.48
(58) Field of Classification Search ............ 297/452.13, 297/452.48, 452.56, 452.5
See application file for complete search history.

(56) References Cited

U.S. PATENT DOCUMENTS

| | | | | |
|---|---|---|---|---|
| 2,633,184 A * | 3/1953 | Karg | ................................ | 5/247 |
| 3,080,579 A * | 3/1963 | Gordon | ........................ | 267/103 |
| 4,869,554 A * | 9/1989 | Abu-Isa et al. | ......... | 297/452.56 |
| 5,013,089 A | 5/1991 | Abu-Isa et al. | ............... | 297/452 |
| 5,076,643 A * | 12/1991 | Colasanti et al. | .......... | 297/284.6 |
| 5,624,161 A * | 4/1997 | Sorimachi et al. | ....... | 297/452.52 |
| 2002/0096932 A1* | 7/2002 | Fujita et al. | ............. | 297/452.56 |
| 2002/0135218 A1* | 9/2002 | Fujita et al. | ............. | 297/452.56 |
| 2003/0193231 A1* | 10/2003 | Fujita et al. | ............. | 297/452.56 |
| 2004/0130202 A1* | 7/2004 | Kawasaki | ............... | 297/452.56 |
| 2006/0055225 A1 | 3/2006 | Yasuda et al. | | |

FOREIGN PATENT DOCUMENTS

EP 1 552 981 A1 7/2005

(Continued)

OTHER PUBLICATIONS

First Notification of Office Action for Chinese Application No. 200610101429.5, dated May 8, 2009.
European Search Report for Application No. 06253683, dated Jul. 28, 2010.

*Primary Examiner*—Sarah B McPartlin
(74) *Attorney, Agent, or Firm*—Marshall, Gerstein & Borun LLP

(57) ABSTRACT

A seat cushion of a vehicle seat has a base seat whose front end is anchored to a front frame of a frame for a sitting portion, and whose rear end is connected to a rear frame of the frame for a sitting portion via helical tension springs. A supporter, supported via helical tension springs at a pair of left and right side frames of the frame for a sitting portion, is disposed at a lower side of the base seat so as to support a femoral region of a seated person. The supporter and the helical tension springs structure an auxiliary vibration system whose mass element is a femoral region of a seated person. The auxiliary vibration system is made to function as a dynamic vibration absorber with respect to up-down vibrations of a main vibration system whose mass element is an upper body of a seated person.

18 Claims, 12 Drawing Sheets

FOREIGN PATENT DOCUMENTS

| | | |
|---|---|---|
| JP | 2002-177099 | 6/2002 |
| JP | 2002-219985 | 8/2002 |
| JP | 2003-182427 | 7/2003 |
| JP | 2004-188164 A | 7/2004 |
| JP | 2004-209017 A | 7/2004 |
| WO | WO-2004/026080 A1 | 4/2004 |
| WO | WO-2004/080243 A1 | 9/2004 |

* cited by examiner

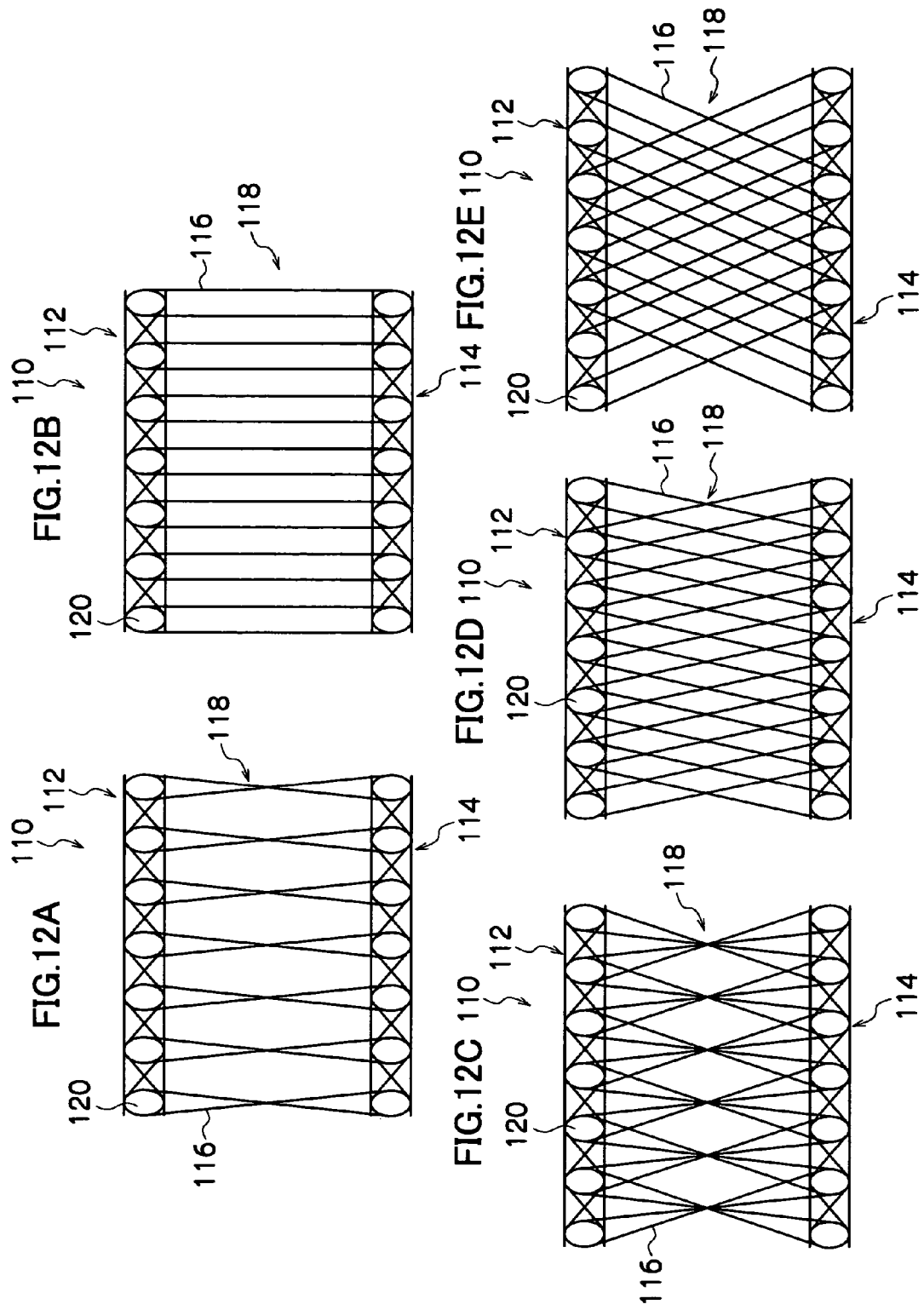

SEAT

CROSS-REFERENCE TO RELATED APPLICATION

This application claims priority under 35 USC 119 from Japanese Patent Application No. 2005-205342, the disclosure of which is incorporated by reference herein.

BACKGROUND OF THE INVENTION

1. Field of the Invention

The present invention relates to a seat on which a person sits, and in particular, relates to a seat such as a seat for a means of transport or the like which is installed in a means of transport such as an automobile or the like.

2. Description of the Related Art

As seats for vehicles, there have been proposed seats in which a seat cushion is structured by stretching a tension structure, which is a three-dimensional solid knit fabric or a two-dimensional woven fabric or the like formed by a pair of ground knit materials and connecting threads disposed between the ground knit materials, over a frame for a sitting portion as a cushion material (see, for example, U.S. Pat. No. 5,013,089, and Japanese Patent Applications Laid-Open (JP-A) Nos. 2002-177099, 2002-219985 and 2003-182427). In such a seat, because the cushion material is structured by elastic threads which are difficult to weaken, the seat is thin and can achieve a good elastic characteristic (cushionability) as compared with a structure in which, for example, urethane is used as the cushion material.

However, in a conventional seat for a vehicle such as that described above in which a three-dimensional solid knit fabric and/or a two-dimensional woven fabric is stretched over the frame for the sitting portion, it is desired to obtain an even better elastic characteristic and to suppress vibration of the head portion of the seated person in particular.

SUMMARY OF THE INVENTION

In view of the aforementioned, the present invention provides a seat which can effectively suppress vibration of the head portion of a seated person.

A seat relating to a first aspect of the present invention has: a frame for a sitting portion; a seat material whose front end side is fixed to a front end side of the frame for a sitting portion, and whose rear end side is connected to a rear end side of the frame for a sitting portion via an elastic member; and a support member disposed at a lower side of the seat material, and elastically supported at the frame for a sitting portion so as to support a femoral region of a seated person.

In the seat of the first aspect, when downward load is applied to the seat material as a person sits down, the seat member deflects downward and sinks-in, while an increase in tension accompanying the sitting-down is suppressed by the elastic member elastically deforming. Due to an increase in the tension of the seat material being suppressed, the damping needed for vibrations and shock is ensured, and restoring force is guaranteed by the elastic member. Namely, the cushion performance is ensured.

The portion at the seat member which sinks-in in this way, which portion supports the femoral region of the seated person, is supported from below by the support member which is elastically supported at the frame for a sitting portion. In this way, at the sitting portion, an auxiliary vibration system, whose mass element is the femoral region and which includes (the elastic supporting portion of) the support member in the spring element, is formed separately from a main vibration system whose mass element is the upper body (trunk) supported at the buttocks (mainly the region beneath the ischial tuberosities) of the seated person. Accordingly, by setting this auxiliary vibration system to function as a dynamic vibration absorber (including cases in which it is a dynamic vibration absorber including a damper), mainly up-down direction vibrations of the upper body of the seated person, i.e., the head portion, can be suppressed.

In this way, in the seat of the first aspect, vibrations of the head portion of the seated person can be effectively suppressed. Note that the support member itself may be structured as an elastic structure. It is desirable that, a three-dimensional solid knit fabric, which can transfer the seated load from above, as the seat material, be stretched at the frame for a sitting portion.

In a seat relating to a second aspect, in the seat of the first aspect, the support member is structured so as to include a tension structure which, by tension, supports load which is applied from a direction intersecting a direction of tension.

In the seat of the second aspect, because the support member which is a tension structure supports the femoral region while deforming appropriately in accordance with the femoral region, the support member does not impart a strange sensation (the sensation of there being a foreign object) to the seated person.

In a seat relating to a third aspect, in the seat of the first or second aspect, the frame for a sitting portion has a pair of left and right side frames, and a left end side of the support member is connected to the side frame at a left side via an elastic member, and a right end side of the support member is connected to the side frame at a right side via an elastic member.

In the seat of the third aspect, because the left and right both ends of the support member are connected to the corresponding side frame via elastic members respectively, the support member reliably follows the downward deflecting of the seat material, and supports the femoral region. Because the elastic members are separate members from the support member, setting for making the aforementioned auxiliary vibration system function as a dynamic vibration absorber is easy.

In a seat relating to a fourth aspect, in the seat of the third aspect, a front portion and a rear portion of the left end side of the support member are independently connected to the side frame at the left side via elastic members, and a front portion and a rear portion of the right end side of the support member are independently connected to the side frame at the right side via elastic members.

In the seat of the fourth aspect, the front and rear portions of the left and right both ends of the support member are respectively and independently connected to the corresponding side frames via elastic members. Therefore, the femoral region of the seated person can be supported at a tension plane. In this way, it is possible to effectively prevent an unpleasant sensation due to a tension line from being imparted to the seated person.

In a seat relating to a fifth aspect, in the seat of the fourth aspect, spring constants of the elastic members which connect the rear portion of the left end side and the rear portion of the right end side of the support member to the side frames corresponding thereto, are larger than spring constants of the elastic members which connect the front portion of the left end side and the front portion of the right end side of the support member to the side frames corresponding thereto.

In the seat of the fifth aspect, because the spring constants of the rear portion side, at which the supported load is relatively large, are larger than the spring constants at the front portion, the aforementioned auxiliary vibration system can effectively be made to function as a dynamic vibration absorber.

In a seat relating to a sixth aspect, the seat of any one of the first through fifth aspects further has: a frame for a back portion having a pair of left and right side frames for a back portion; a cushion material for a back portion stretched at the frame for a back portion; and a support member for a back portion which is elastically supported at the left and right side frames for a back portion between lower portions of the left and right side frames for a back portion, and which increases support rigidity of a portion supporting a lumbar region of a seated person.

In the seat of the sixth aspect, the cushion material for a back portion, which is stretched at the frame for a back portion, supports the upper body of the seated person from the rear side. The support member for a back portion, which is elastically supported between the left and right side frames for a back portion which structure the frame for a back portion, increases the support rigidity of the portion which supports the lumbar region of the seated person, as compared with a structure which does not have this support member for a back portion. In this way, front-back movement of the lumbar region is suppressed, and vibration mainly in the front-back direction (the direction of swinging around the lumbar region) of the head portion is suppressed. Accordingly, at the present seat, it is possible to suppress up-down direction and front-back direction vibrations of the head portion of the seated person.

In order to achieve the above-described object, a seat relating to a seventh aspect has: a frame for a back portion having a pair of left and right side frames for a back portion; a cushion material for a back portion stretched at the frame for a back portion; and a support member for a back portion which is elastically supported at the left and right side frames for a back portion between lower portions of the left and right side frames for a back portion, and which increases rigidity of a portion supporting a lumbar region of a seated person.

In the seat of the seventh aspect, the cushion material for a back portion, which is stretched at the frame for a back portion, supports the upper body of the seated person from the rear side. The support member for a back portion, which is elastically supported between the left and right side frames for a back portion which structure the frame for a back portion, increases the support rigidity of the portion which supports the lumbar region of the seated person, as compared with a structure which does not have this support member for a back portion. In this way, front-back movement of the lumbar region is suppressed, and vibration mainly in the front-back direction (the direction of swinging around the lumbar region) of the head portion is suppressed.

In this way, in the seat of the seventh aspect, it is possible to effectively suppress vibrations of the head portion of the seated person.

In a seat relating to an eighth aspect of the present invention, in the seat of either the sixth or seventh aspect, the support member for a back portion is structured so as to include two layers of a three-dimensional solid knit fabric.

In the seat of the eighth aspect, the support member for a back portion is structured by layering two or more layers of a three-dimensional solid knit fabric which is formed by a pair of ground knit fabrics and connecting threads disposed between the ground knit fabrics. Therefore, the seat can provide supporting, without crushing the muscles of the lumbar region of the seated person, and while increasing overall the support rigidity of the portion which supports the lumbar region at the back portion (the seat back). Therefore, pain of the lumbar region of the seated person can be suppressed or prevented, while vibrations of the head portion of the seated person are suppressed.

In a seat relating to a ninth aspect of the present invention, in the seat of the eight aspect, the support member for a back portion is structured such that a cushion member is sandwiched between the two layers of the three-dimensional solid knit fabric.

In the seat of the ninth aspect, the support member for a back portion is structured by a cushion member being sandwiched between three-dimensional solid knit fabrics. Therefore, pain of the lumbar region of the seated person can be even more effectively suppressed or prevented. Note that a three-dimensional solid knit fabric may be used as the cushion member.

In a seat relating to a tenth aspect of the present invention, in the seat of the first aspect, the seat material is structured so as to include two layers of a three-dimensional solid knit fabric.

In a seat relating to an eleventh aspect of the present invention, in the seat of the tenth aspect, the seat material is structured such that a cushion member is sandwiched between the two layers of the three-dimensional solid knit fabric.

In a seat relating to a twelfth aspect of the present invention, in the seat of the second aspect, the support member is structured so as to include a two-dimensional cloth material.

As described above, the seat structure relating to the present invention has the excellent effect of being able to effectively suppress vibrations of the head portion of a seated person.

BRIEF DESCRIPTION OF THE DRAWINGS

An embodiment of the present invention will be described in detail with reference to the following figures, wherein:

FIGS. 12A through 12E are respectively schematic sectional views of main portions of the three-dimensional solid knit fabric, showing applied examples of a pile portion.

DETAILED DESCRIPTION OF THE INVENTION

A vehicle seat 10, which serves as a seat relating to an embodiment of the present invention, will be described on the basis of FIGS. 1 through 8. Note that arrow UP, arrow LO, arrow FR, arrow RE, arrow RI and arrow LE shown appropriately in the respective drawings respectively denote the front direction (traveling direction), the rear direction, the upward direction, the downward direction, the rightward direction, and the leftward direction, with the traveling direction of the vehicle in which the vehicle seat 10 is installed being the reference. When up, down, front, rear, right, left are to merely be designated hereinafter, they correspond to the directions of the aforementioned respective arrows.

Figure 1:
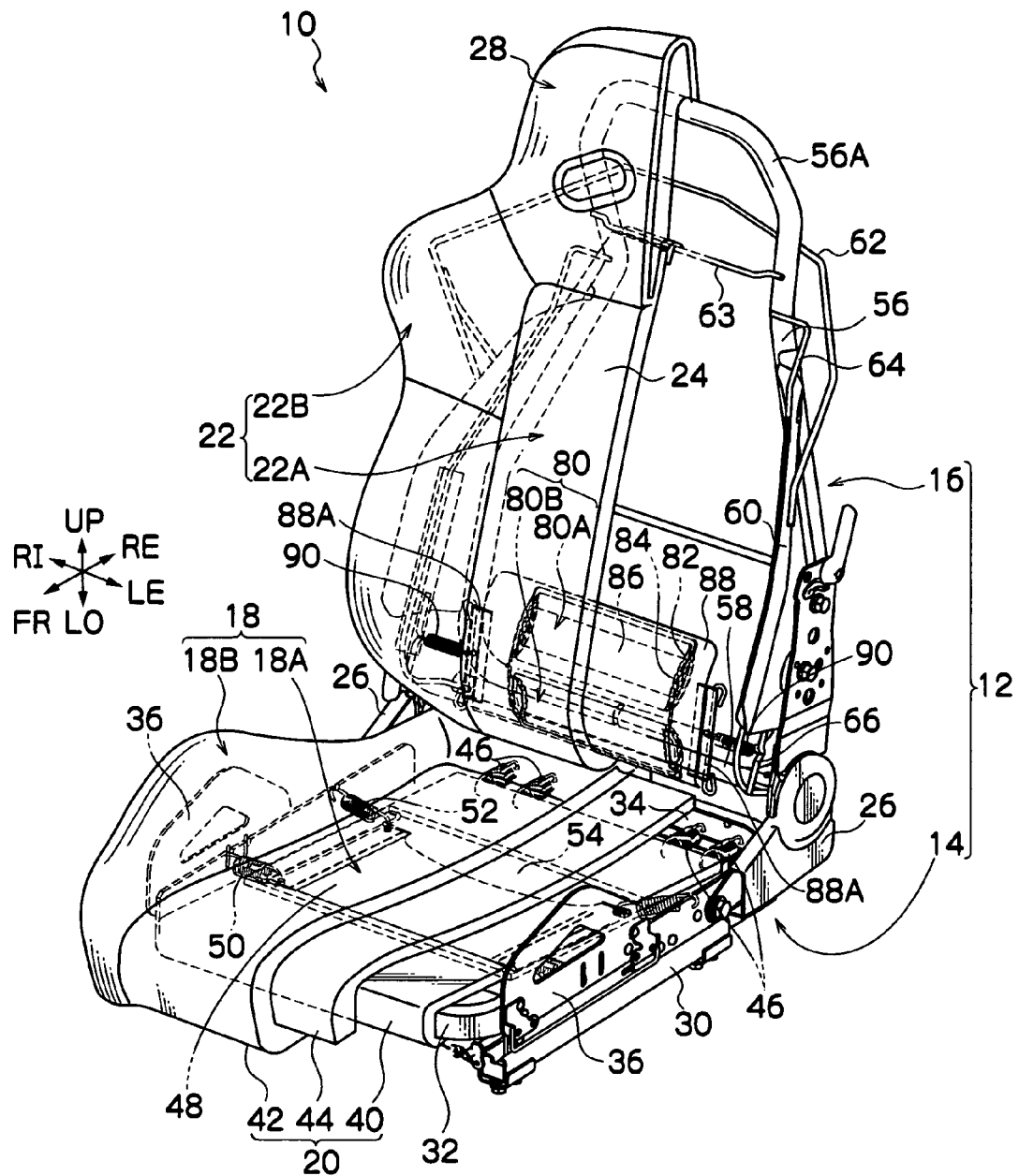
FIG. 1 is a perspective view, a portion of which is cut-away, showing the schematic overall structure of a vehicle seat relating to the embodiment of the present invention.
Figure 2:
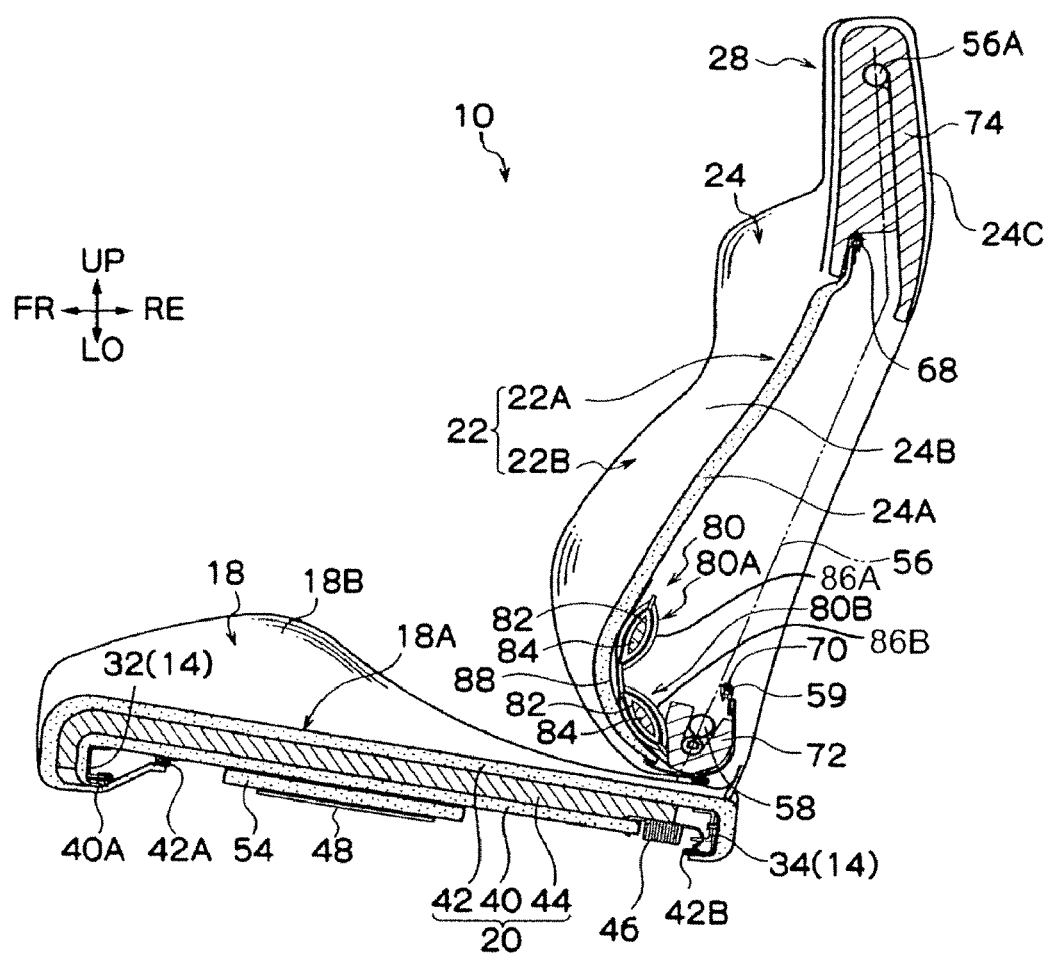
FIG. 2 is a side sectional view taken along line 2-2 of FIG. 1.

In FIG. 1, the overall structure of the vehicle seat 10 is shown in a perspective view, a portion of which is cut away. A side sectional view of the vehicle seat 10 is shown in FIG. 2. As shown in these drawings, the vehicle seat 10 has a seat frame 12. The seat frame 12 is structured to have a frame 14 for a sitting portion which is a seat cushion frame, and a frame 16 for a back portion which is a seat back frame.

Further, by providing a cushion material 20 at the frame 14 for the sitting portion, a seat cushion 18 serving as a sitting portion is formed. By providing a cushion material 24 for the back portion at the frame 16 for the back portion, a seat back 22 is formed. The bottom end of the frame 16 for the back portion is connected to the rear end portion of the frame 14 for the sitting portion, so as to be rotatable around a supporting shaft via reclining mechanisms 26. In this way, the seat back 22 can be rotated around the supporting shaft with respect to the seat cushion 18, and can be held at an arbitrary rotational position.

Figure 3:
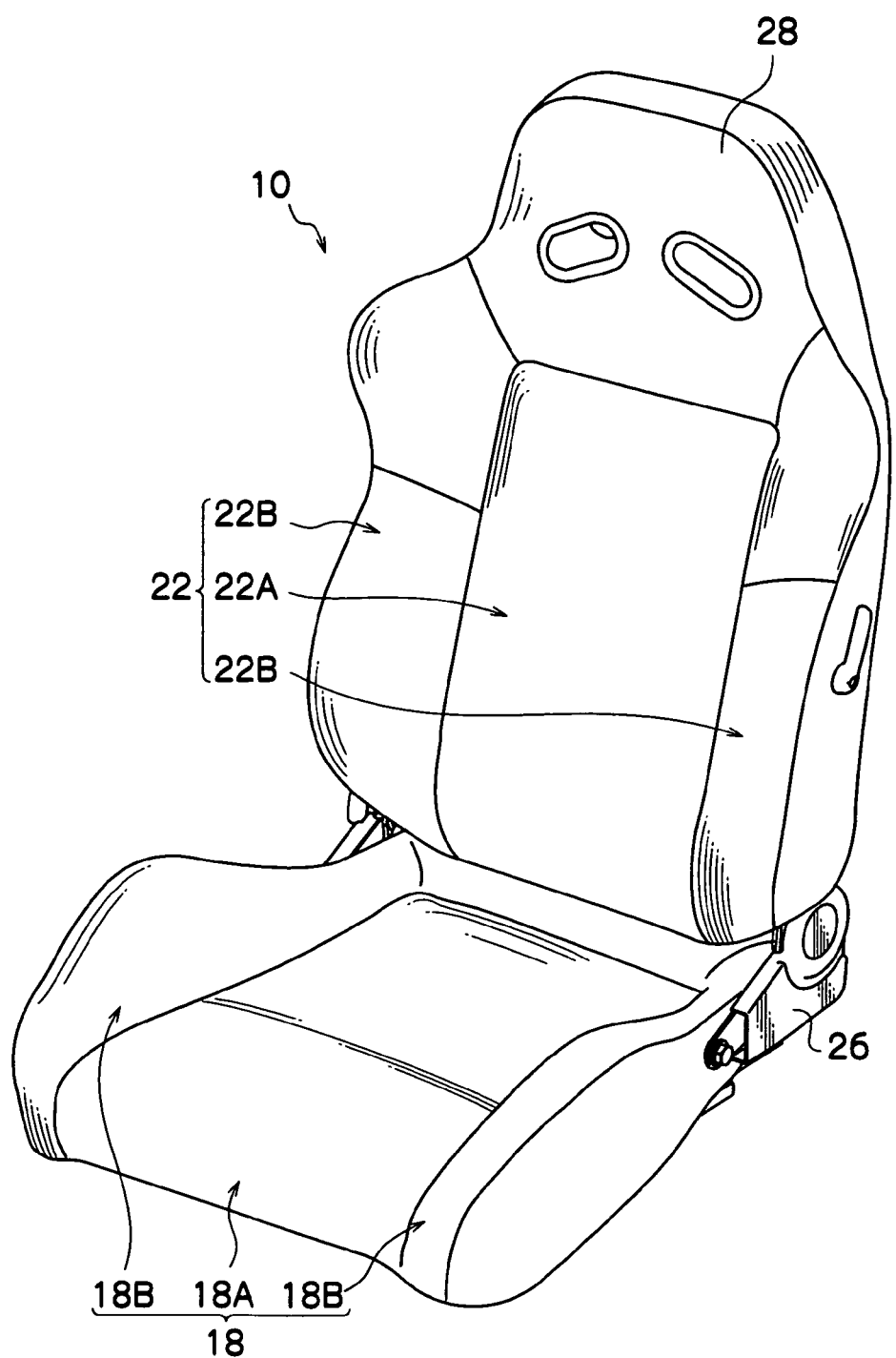
FIG. 3 is a perspective view showing the exterior of the vehicle seat relating to the embodiment of the present invention.

As shown in FIG. 3, at the seat cushion 18, side supports 18B, which project further upward than a substantially flat sitting surface portion 18A, are formed at the both transverse (left-right) direction sides of the sitting surface portion 18A. Further, at the seat back 22, side supports 22B, which project further forward than a substantially flat back rest 22A, are formed at the both transverse direction sides of the back rest 22A. A head rest 28 is provided at the top of the seat back 22. In the present embodiment, the head rest 28 is formed integrally with the seat back 22.

The concrete structures of the seat cushion 18 and the seat back 22 will be described hereinafter in that order. Then, a concrete example of a three-dimensional solid knit fabric 110, which structures the cushion materials 20, 24 and a lumbar support cushion 80 which will be described later, will be described.

(Structure of Seat Cushion)

As shown in FIGS. 1 and 2, the frame 14 for the sitting portion, which structures the seat cushion 18, has a pair of left and right side frames 30 which are respectively long in the front-back direction. Further, the frame 14 for the sitting portion has, in vicinities of the front and rear ends of the pair of left and right side frames 30, a front frame 32 and a rear frame 34 which connect the side frames 30. In this way, the frame 14 for the sitting portion is formed in the shape of a rectangular frame.

A side support plate 36, which is formed substantially in the shape of a mountain as seen in side view and which is for causing the front portion of the side support 18B to protrude more than the rear portion thereof, is fixed to the front portion of each side frame 30. The base portions of the aforementioned reclining mechanisms 26 are fixed to the rear end portions of the side frames 30.

The cushion material 20 is stretched over the frame 14 for the sitting portion. As shown in FIGS. 1 and 2, the cushion material 20 is structured as a three-layer structure by a base seat 40 serving as the seat material in the present invention, a surface layer seat 42 disposed at the upper side of the base seat 40, and a urethane cushion 44 disposed between the base seat 40 and the surface layer seat 42.

In the present embodiment, the base seat 40 and the surface layer seat 42 are both structured by the three-dimensional solid knit fabric 110 which has a mesh (net) structure. Elongation, in the surface direction, accompanying internal damping due to tension, and restoration due to canceling of that tension, are possible. Further, by forming the base seat 40 and the surface layer seat 42 of the three-dimensional solid knit fabric 110, crushing in the direction of thickness which accompanies internal damping due to load in the direction intersecting the surface direction, and restoration due to canceling of that load, are possible. The urethane cushion 44 is formed by a polyurethane foam.

As shown in FIGS. 1 and 2, a hook portion 40A, which is provided at the front end of the base seat 40 which is trained around the front frame 32, is anchored on the front frame 32. The rear end of the base seat 40 is connected to the rear frame 34 via helical tension springs 46 serving as elastic members. Note that the width of the base seat 40 is formed to be smaller than the interval between the left and right side frames 30, such that gaps are formed between the left and right edge portions of the base seat 40 and the side frames at the corresponding sides.

Two of the helical tension springs 46 are disposed in a vicinity of each of the both transverse direction ends of the base seat 40 (for a total of four helical tension springs 46). The rear ends of the respective helical tension springs 46 are anchored on the rear frame 34 such that the front ends thereof can rotate in the directions of moving up and down. At the base seat 40 which is supported at the frame 14 for the sitting portion via the helical tension springs 46, the initial tension (mainly the tension counterpoising the load accompanying the pulling of the helical tension springs 46) is less than or equal to 200 N, and the elongation in the front-back direction is less than or equal to 5%.

In this way, the rear end of the base seat 40 can approach and move away from the rear frame 34 in the front-back direction while extending and contracting the respective helical tension springs 46, and can rotate around the region of being supported at the rear frame 34 at the respective helical tension springs 46. Accordingly, a planar (two-dimensional) tension field is formed at the base seat 40 by the plural helical tension springs 46 which are provided along the front-back direction and in parallel, and, due to the arrangement in which the helical tension springs 46 are positioned at both end sides in the transverse direction, one-dimensional tension lines are formed at the both end sides. A three-dimensional tension field is generated as a person sits-down.

In the present embodiment, due to the helical tension springs 46 extending while rotating such that the front ends thereof fall as a person sits down, a low tension field (low rigidity plane), at which the tension (surface rigidity, supporting pressure) is relatively low, is formed between the helical tension springs 46 at the transverse direction inner side, and high tension fields (high rigidity planes), at which the tension is relatively high, are formed along lines extending from the helical tension springs 46 in plan view. Namely, at the seat cushion 18, a low tension field is formed at the traverse direction central portion at the base seat 40 which corresponds to the ischial tuberosities where the weight of the seated person concentrates, and high tension fields are formed at the both transverse direction end portions which support the sides of the body of the seated person.

The urethane cushion 44 is placed on the base seat 40. As shown in FIG. 2, the urethane cushion 44 is formed substantially flat from the portion structuring the sitting surface portion 18A to the portion covering above the front portions of the helical tension springs 46. The front end of the urethane cushion 44 covers the front frame 34 from the front side. Further, although not illustrated, the urethane cushion 44 is formed so as to cover the left and right side support plates 36. Moreover, the surface layer seat 42 is stretched over the frame 14 for the sitting portion so as to cover the urethane cushion 44 from the upper (outer) side.

Concretely, unillustrated hook portions, which are provided at the left and right both ends of the surface layer seat 42, are anchored on the corresponding side frames 30. Moreover, a hook portion 42A, which is provided along the left-right direction at the front end of the surface layer seat 42 which circles-around the front frame 32, is anchored on an anchor portion 14A disposed at the rear of the front frame 32. A hook portion 42B, which is provided at the rear end of the surface layer seat 42 which is trained around the rear frame 34, is anchored on the rear portion of the rear frame 34. Moreover, due to the surface layer seat 42 being tensed from the interior by unillustrated wires, whose one ends are anchored at appropriate positions of the frame 14 for the sitting portion, the sitting surface portion 18A and the side supports 18B are formed so as to follow along the configuration of the urethane cushion 44. The elongation of the surface layer seat 42 in each of the left-right direction and the front-back direction in a state in which no one is seated (a no-load state) is less than or equal to 5%.

At the seat cushion 18 which is structured as described above, mainly the base seat 40 supports the weight of the seated person by tension which counterpoises the load of the helical tension springs 46. The surface layer seat 42, which is stretched over the frame 14 for the sitting portion independently of the base seat 40, supports a portion of the weight of the seated person.

Moreover, at the seat cushion 18, a supporter 48 which serves as a support member is elastically supported at the frame 14 for the sitting portion. In the same way as (the base seat 40 and the surface layer seat 42 which structure) the cushion material 20, the supporter 48 is a tension structure. In the present embodiment, the supporter 48 is structured by a cloth material which is a two-dimensional tension structure which is difficult to elongated as compared with the three-dimensional solid knit fabric 110.

Figure 4:
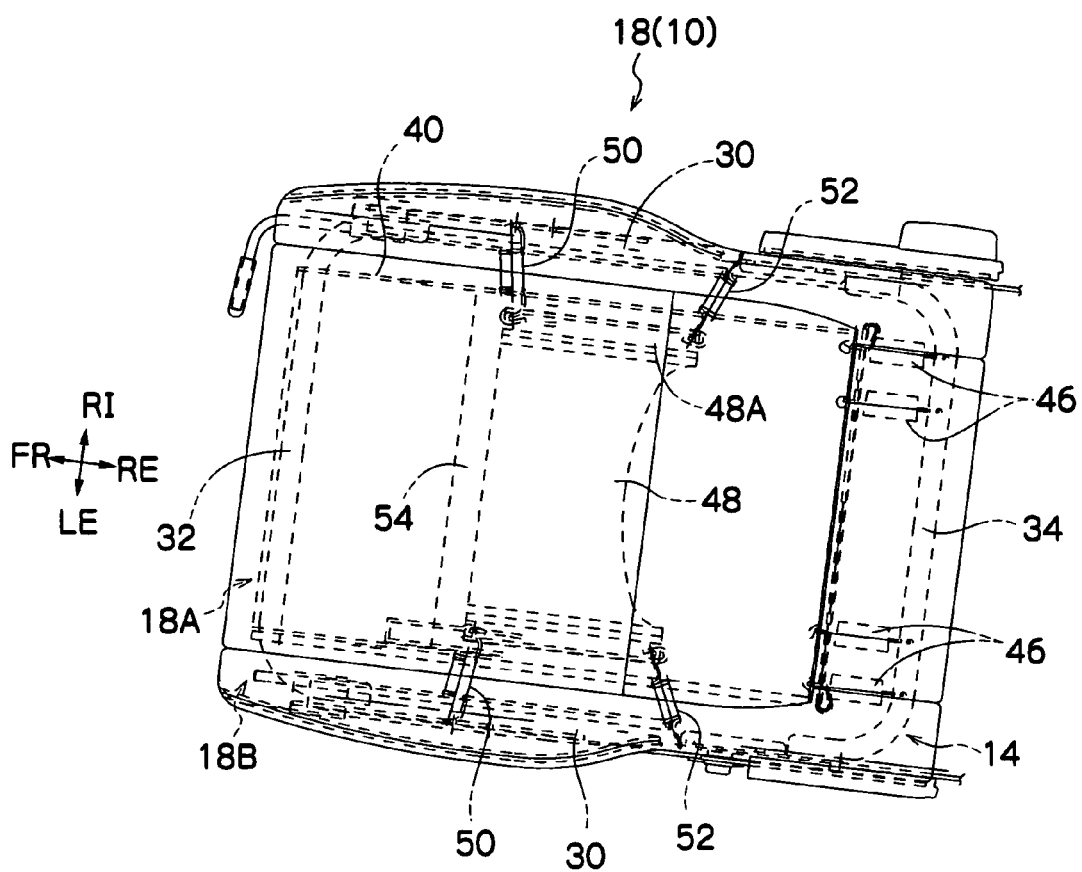
FIG. 4 is a plan view showing a seat cushion structuring the vehicle seat relating to the embodiment of the present invention.
Figure 5:
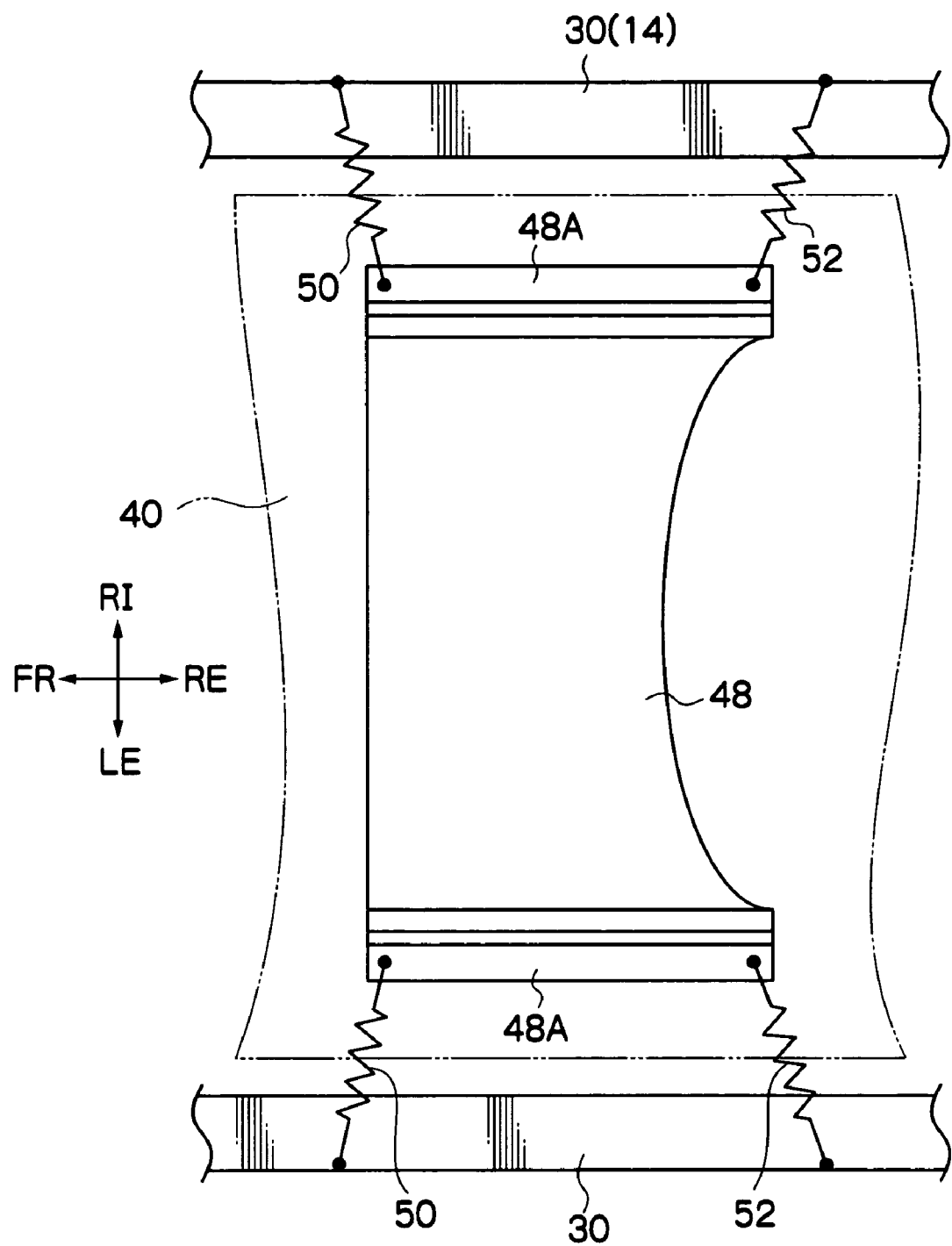
FIG. 5 is a plan view showing, in an enlarged manner, a supporter structuring the vehicle seat relating to the embodiment of the present invention.

As shown in FIG. 5, the supporter 48 is formed in a shape such as if the rear end of a rectangle, which is long in the transverse direction as seen in plan view, were cut-out in a substantial arc shape. The left-right width of the supporter 48 is slightly smaller than the left-right width of the base seat 40. As shown in FIG. 4, the transverse direction both ends of the supporter 48 are positioned so as to substantially correspond to the positions, in the left-right direction, of the helical tension springs 46 which are positioned at the outermost sides in the transverse direction. In the front-back direction, the supporter 48 is disposed at a position which supports, from beneath, the femoral region of the seated person. Concretely, the supporter 48 is disposed such that the transverse direction central portion of the curved rear edge of the supporter 48 is positioned further forward than the position corresponding to beneath the ischial tuberosities of the seated person.

As shown in FIG. 1, the supporter 48 is elastically supported at the frame 14 for the sitting portion via helical tension springs 50, 52. The both transverse direction ends of the supporter 48 are reinforced by reinforcing fabrics 48A. As shown in FIG. 5, a pair of the helical tension springs 50 are provided, with one at the left and one at the right. The helical tension springs 50 connect vicinities of the front ends of the reinforcing fabrics 48A of the supporter 48 with the corresponding side frames 30 of the frame 14 for the sitting portion. Further, a pair of the helical tension springs 52 are provided, with one at the left and one at the right. The helical tension springs 52 connect vicinities of the rear ends of the reinforcing fabrics 48A of the supporter 48 with the corresponding side frames 30 of the frame 14 for the sitting portion.

In the present embodiment, the supporting points, at which the helical tension springs 50 are supported at the side frames 30, are positioned further forward than the supporting points at which the helical tension springs 50 are supported at the supporter 48. The supporting points, at which the helical tension springs 52 are supported at the side frames 30, are positioned further rearward than the supporting points at which the helical tension springs 52 are supported at the supporter 48. Note that the helical tension springs 50, 52 which are positioned at opposite angles are disposed such that the lines extending from the axes thereof do not intersect one another on the supporter 48.

A support cushion 54, which is substantially rectangular in plan view, is placed above the above-described supporter 48. The support cushion 54 covers the entire surface of the supporter 48, and contacts the bottom surface of the base seat 40 in a state in which no one is seated. In this way, at the seat cushion 18, as a person sits-down, the load is transferred from the portion which mainly supports the femoral region of the seated person at the cushion material 20, to the supporter 48 (the helical tension springs 50 and 52) via the support cushion 54.

Therefore, at the seat cushion 18, the support rigidity of the front portion of the low tension field at the transverse direction center which the base seat 40 forms, i.e., the femur supporting portion which is further forward than beneath the ischial tuberosities, is higher than the support rigidity beneath the ischial tuberosities. Note that the support cushion 54 is structured by the three-dimensional solid knit fabric 110, and is structured so as to not crush the muscles of the femoral region while, from a macro standpoint, increasing the support rigidity of the femur supporting portion.

In the above-described seat cushion 18, a low rigidity surface is structured at the rear portion of the sitting surface portion 18A between the two helical tension springs 46 disposed at each of the left and the right. A characteristic (hereinafter called "zero spring characteristic"), which is such that the spring constants at the portions supporting the convex portions of the human body are lower than the spring constants at other portions, is realized at this low rigidity surface. In accordance with the zero spring characteristic, at the seat cushion 18, impeding of (body movement accompanying) breathing of the seated person is suppressed, and the ability to cut off vibration (amplitude) in order for the damping ratio to become relatively large is good, and fluctuations in body pressure at the time when vibration is input can be suppressed. Moreover, the seat cushion 18 is structured such that an anchor effect, by which the region beneath the ischial tuberosities of the seated person is filled-in by the cushion material 20, is created by the aforementioned zero spring characteristic. In addition, restoring force owing to the helical tension springs 46 is ensured at the entire seat cushion 18 (sitting surface portion 18A).

The low rigidity surface which realizes this zero spring characteristic is disposed so as to include the region beneath the ischial tuberosities of the seated person. Note that, in the present embodiment, the position beneath the ischial tuberosities of the seated person is set to be a position at a distance of substantially 150 mm from the rear end of the seat cushion 18 (the front surface of the bottom portion of the seat back 22 at the time when a person is seated) in the front-back direction. Further, the distance between the left and right ischial tuberosities is 100 mm to 130 mm.

On the other hand, the high tension regions due to the two (at each side) helical tension springs 46 are set at the outer sides of the pelvis of the seated person, and realize a body-side supporting structure which supports, from the sides, the portions from the buttocks to (the base sides of) the femoral region. Further, as a person sits down, the supporter 48, which is for supporting the femoral region of the seated person, forms an elastic dam within a needed range which is forward of the region corresponding to the region beneath the ischial tuberosities of the seated person. The elastic dam can be thought of as a portion where the base seat 40, which is deflected downward, rises upward toward the front frame 32.

By forming the tension fields including the high tension portions and the low tension portion at the base seat 40 by solid support in three dimensions, comprehensive impedance (force transmitting characteristic) matching and compliance matching between the seat cushion 18 (the cushion material 20) and (the muscles of) the human body are aimed for. In this way, with the above-described zero spring characteristic, while the weight of the seated person is dispersed and the seated person is supported well by the body-side supports, the muscles of the seated person at the portions contacting the seat cushion 18 are not crushed. Therefore, at the seat cushion 18, while the posture of the seated person is maintained, the offset force (in the direction tangent to the surface) and the pressure (in the normal line direction) applied to the skin and the muscles of the seated person, and stress such as pain or an unpleasant sensation or the like based on vibration transfer, and the numbness and pain due to being seated over a long period of time, are mitigated, and the accumulation of fatigue which accompanies sitting for a long time is suppressed.

The supporter 48, which is elastically supported at the frame 14 for the sitting portion by the helical tension springs 50, 52, structures an auxiliary vibration system, in which the femoral region of the seated person is a mass element and the elasticities of the femur supporting portions including the helical tension springs 50, 52 and the like are spring elements, with respect to a main vibration system in which the upper body (the trunk) of the seated person is a mass element and the elasticity of the portion of the seat cushion 18 supporting the upper body (beneath the ischial tuberosities) is a spring element. By providing the supporter 48 and the helical tension springs 50, 52 at the seat cushion 18, the auxiliary vibration system, in which the femoral region of the seated person is a mass element and the elasticities of the femur supporting portions including the helical tension springs 50, 52 and the like are spring elements, functions as a dynamic vibration absorber (kinematic viscosity vibration absorber) with respect to vibrations, in the up-down direction, of the main vibration system in which the upper body (the trunk) of the seated person is a mass element and the elasticity of the portion of the seat cushion 18 supporting the upper body (beneath the ischial tuberosities) is a spring element.

Figure 6:
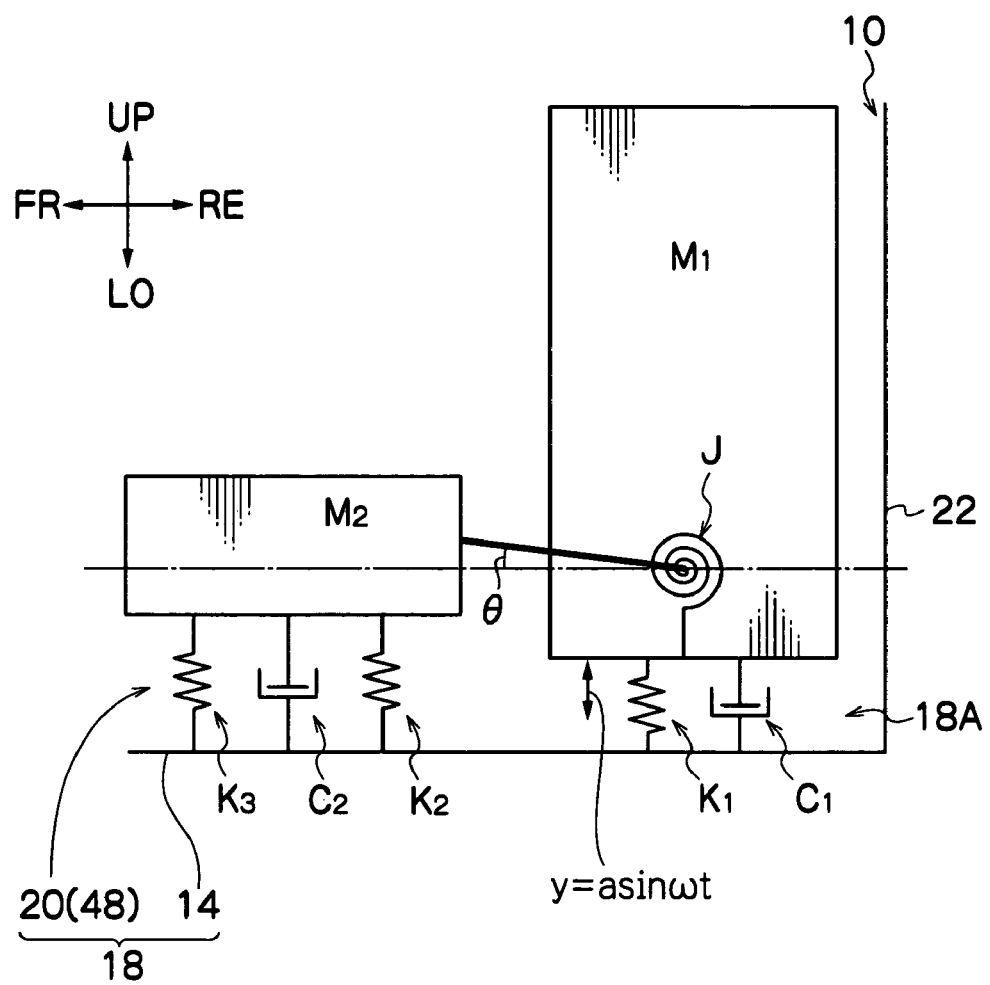
FIG. 6 is a schematic drawing showing a vibration model structured by a seated person and the seat cushion structuring the vehicle seat relating to the embodiment of the present invention.

A vibration model of the vehicle seat 10 and a seated person is shown in FIG. 6. In FIG. 6, mass M1 represents the weight of the upper body of the seated person, spring K1 represents the elasticity of the rear portion of the seat cushion 18, and dashpot C1 represents the damping of the rear portion of the seat cushion 18. Further, mass M2, which corresponds to the femoral region, is connected to the mass M1 via joint J. Here, the joint J, which transfers torque by the relative angular displacement of the masses M1, M2, is modeled as a torsion spring element. Further, the mass M2 is supported at the seat cushion 18 by springs K2, K3, which are elastic elements including the helical tension springs 50, 52, and dashpot C2, which is the damping of the cushion material 20 including the supporter 48 and the support cushion 54.

From this model, it can be understood that the supporter 48 (the helical tension springs 50, 52), which is elastically supported at the frame 14 for the sitting portion, is a parallel spring to the hip joint J which is a torque transfer element between the trunk and the legs of the seated person, and is used in adjusting the natural frequency of the auxiliary vibration system with respect to the main vibration system. On the basis of this model, the spring constants of the helical tension springs 50, 52 are set such that the auxiliary vibration system of the femoral region (the mass M2) functions as a dynamic vibration absorber with respect to the up-down direction vibrations of the main vibration system of the upper body (the mass M1) which includes the head portion, as described above.

In the present embodiment, the spring constants of the respective helical tension springs 50 (springs K3) and the respective helical tension springs 52 (springs K2) are set to be different from one another, and the spring constants of the helical tension springs 52 are set to be greater than the spring constants of the helical tension springs 50. In the present structure which targets a Japanese male, the spring constant of each helical tension spring 52 is set to be substantially 1.87 [N/mm], as compared with the spring constant of each helical tension spring 50 which is set to be substantially 0.40 [N/mm].

(Structure of Seat Back)

As shown in FIG. 1, the frame 16 for the back portion has a pipe frame 56 which is formed in an upside-down U-shape which opens downward in front view. The left and right lower ends of the pipe frame 56 are connected together by a lower frame 58 which is long along the transverse direction, and are connected to the rear portions of the corresponding side frames 30 via the reclining mechanisms 26. The upper end of the pipe frame 56, which is narrowed in the left-right direction, is a head rest frame portion 56A. As shown in FIG. 2, a lower side cushion anchor rod 59 spans between the left and right lower ends of the pipe frame 56 at the upper side of the lower frame 58.

Side frames 60, which are long along the up-down direction, are fixedly mounted to the left and right both side portions of the pipe frame 56. Each side frame 60 is formed in the shape of a plate. Due to the side frames 60 being fixed to the pipe frame 56 at the rear portions of the side frames 60, the side frames 60 jut-out further forward than the pipe frame 56. Further, an upper frame 62, which juts-out toward the left and the right and which structures the shoulder portions of the side supports 22B, is fixed to the upper portion of the pipe frame 56. An upper side cushion anchor rod 63 spans between the lower ends of the head rest frame portion 56A, at the front side of the transverse direction central portion of the upper frame 62.

A corresponding end portion of a sub-frame 64, which straddles the intermediate portion in the up-down direction of the pipe frame 56, is fixed to the upper portion and lower end portion at the left and right both side portions of the pipe frame 56, respectively. The intermediate portion of the sub-frame 64 is disposed along the transverse direction inner surfaces of the side frames 60, and the top and bottom ends of the sub-frame 64 project-out upward and downward of the top and bottom ends of the side frames 60. Spring anchor rods 66, which run along the up-down direction in front of the lower end portion of the pipe frame 56, span between the lower portions of the side frames 60 and the lower portion of the sub-frame 64 positioned therebelow. The upper frame 62, the upper side cushion anchor rod 63, and the spring anchor rod 66 are structured by wire materials.

The cushion material 24 is stretched over the frame 16 for the back portion. As shown in FIGS. 1 and 2, the cushion material 24 is structured by a single layer of the three-dimensional solid knit fabric 110. A hook portion 68, which is provided at the upper end of a back rest portion 24A of the cushion material 24 which structures the back rest 22A, is anchored on the upper side cushion anchor rod 63. A hook portion 70, which is provided at the lower end of the back rest portion 24A which is trained, from the outer side of a urethane material 72, around the lower frame 58 covered by the urethane material 72, is anchored on the lower side cushion anchor rod 59. The back rest portion 24A is stretched along the front edges of the side frames 60, and structures the back rest 22A.

At the cushion material 24, side support portions 24B, which structure the left and right side supports 22B, and a head rest portion 24C, which structures the head rest 28, are respectively formed in the shape of a bag and are formed integrally. The side support portions 24B cover an unillustrated urethane material, which is mounted to the outer side of the sub-frame 64, the upper frame 62, and the side frames 60, and the transverse direction side ends of the side supports 24B are anchored to the side frames 60. Further, the transverse direction inner ends at the front sides of the side support portions 24B are made integral with the transverse direction outer ends of the back rest portion 24A by sewing or the like. By stretching these sewn portions at unillustrated wires or the like whose one ends are anchored at appropriate positions of the frame 16 for the back portion, the cushion material 24 is adjusted to the frame 16 for the back portion while left-right direction tension is applied to the respective portions, and the back rest 22A and the side supports 22B are formed.

As shown in FIG. 2, the head rest portion 24C covers a urethane material 74 which covers the head rest frame portion 56A, and structures the head rest 28.

The lumbar support cushion 80, which serves as a cushion material for the back portion, is provided at the seat back 22. The lumbar support cushion 80 is disposed at the inner side (rear side) of the lower portion of the cushion material 24, and makes the support rigidity of the lumbar region of the seated person higher than the other portions. Concrete description will be given hereinafter.

As shown in FIG. 2, the lumbar support cushion 80 is a twin cushion structure in which an upper side cushion 80A and a lower side cushion 80B are connected. Each of the cushions 80A, 80B has a net cushion 82 which is formed in the shape of a flat ring (an endless form) by the substantially rectangular three-dimensional solid knit fabric 110 being folded-over at the central portion and the both end portions of the three-dimensional solid knit fabric 110 being fixed by sewing or the like. Namely, the net cushion 82 includes two layers of the three-dimensional solid knit fabric 110.

An inner cushion 84 is incorporated within each of the net cushions 82. For example, the three-dimensional solid knit fabric 110, polyurethane foam, a bag (an expandable/contractible structure) in which gas is filled, or the like can be used as the inner cushion 84.

The upper side cushion 80A and the lower side cushion 80B are connected together by a connecting bag 86. The connecting bag 86 has an upper side bag 86A and a lower side bag 86B which are connected at the up-down direction central portion, and is formed of a cloth material or the like. The upper side cushion 80A is accommodated in the upper side bag 86A, and the lower side cushion 80B is accommodated in the lower side bag 86B.

A supporting fabric 88 is fixed by sewing or the like to the front surface of the connecting bag 86 of the lumbar support cushion 80. As shown in FIG. 1, the supporting fabric 88 is formed in a substantially rectangular shape which is wider in both the up-down direction and the left-right direction than the lumbar support cushion 80. As shown in FIG. 2, the lumbar support cushion 80 is fixed to the connecting bag 86 so as to form a substantial bow shape which is convex toward the front. Further, the both transverse direction ends of the supporting fabric 88 are reinforced by reinforcing fabrics 88A, respectively.

The other end of a helical tension spring 90, whose one end is anchored to the spring anchor rod 66 at the near side, is anchored to each reinforcing fabric 88A. In a state in which no one is seated, the helical tension springs 90 extend slightly, and apply tension to the supporting fabric 88. In this state, as shown in FIG. 2, the supporting fabric 88 (the lumbar support cushion 80) contacts the lower portion of the rear surface of the back rest portion 24A of the cushion material 24.

Figure 7:
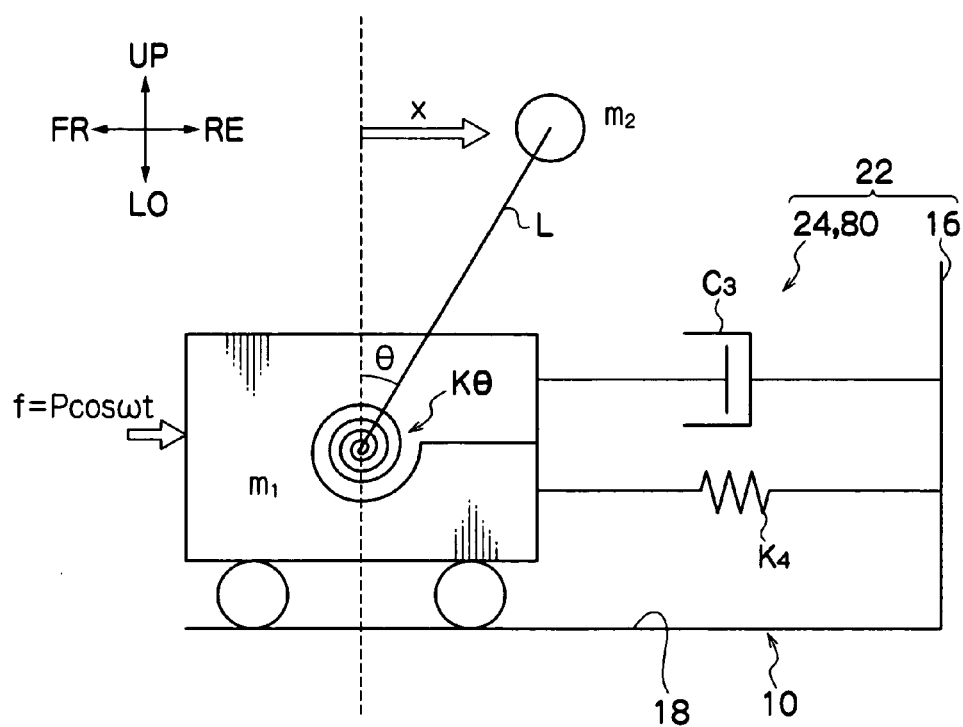
FIG. 7 is a schematic drawing showing a vibration model structured by a seated person and a seat back structuring the vehicle seat relating to the embodiment of the present invention.

Due to the above-described lumbar support cushion 80 being elastically supported at the frame 16 for the back portion via the pair of helical tension springs 90, the support rigidity of the lumbar region of the seated person is increased as described above. In this way, at the seat back 22, vibrations of the head portion of the seated person are reduced. Namely, when the upper body supporting structure formed by the seat back 22 is modeled, it is as shown in FIG. 7. The mass M1, which is supported so as to be movable forward and backward with respect to the seat cushion 18, corresponds to the lower half of the seated person including the lumbar region. The mass M2, which is rotatably supported at the mass M1 via an arm L, corresponds to the head portion. A torsion spring $K\theta$ is provided as a torque transfer element between the arm L and the mass M1. A spring K4 and a dashpot C3, which are disposed between the frame 16 for the back portion and the seated person which are modeled in this way, correspond to the elasticity and damping of the back rest 22A, respectively.

In this model, providing the lumbar support cushion 80, which is elastically supported at the frame 16 for the back portion, corresponds mainly to making the spring constant of the spring K4 and the damping coefficient of the dashpot C3 large as compared with a structure which does not have the lumbar support cushion 80. In the present embodiment, the spring constants of the helical tension springs 90, the elasticity of the lumbar support cushion 80 itself, and the damping characteristic are determined such that the damping ratio is equal to that of a structure which does not have the lumbar support cushion 80. By structuring the lumbar support cushion 80 by the three-dimensional solid knit fabric 110, although the macro support rigidity of the lumbar region is increased, the muscles of the lumbar region are not crushed.

(Concrete Example of Three-Dimensional Solid Knit Fabric)

Next, an example of the three-dimensional solid knit fabric 110, which structures the base seat 40 and the surface layer seat 42 of the cushion material 20, and the cushion material 24, the support cushion 54, and the net cushions 82 of the lumbar support cushion 80, will be described.

Figure 9:
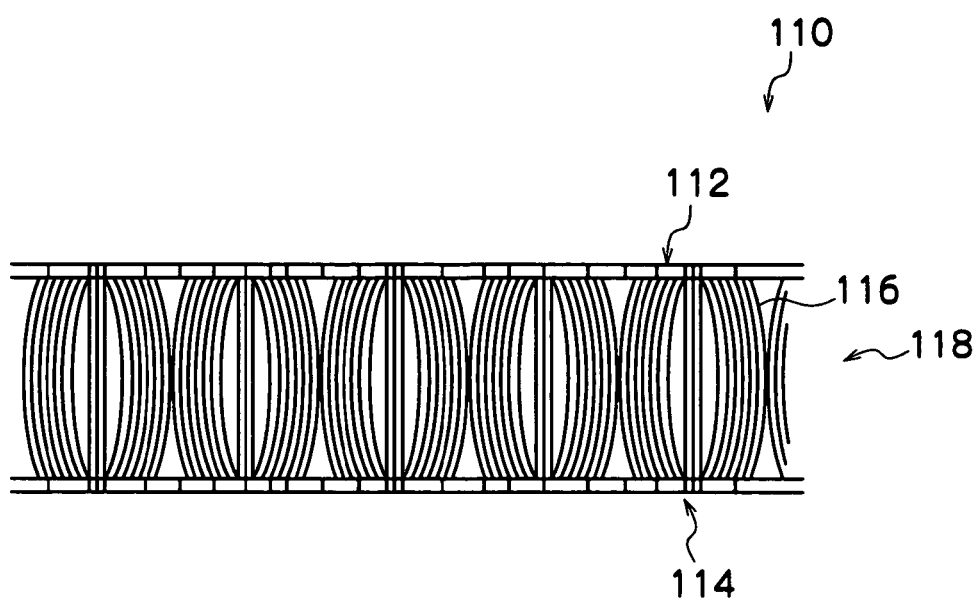
FIG. 9 is a schematic sectional view showing a three-dimensional solid knit fabric used as a cushion member.

As shown in FIG. 9, the three-dimensional solid knit fabric 110 is structured by a pair of ground knit fabrics 112, 114 which are disposed so as to be separated from one another, and a pile portion 118 which is formed by a large number of connecting threads 116 which go back and forth between the pair of ground knit fabrics 112, 114 and join the two.

Figure 10:
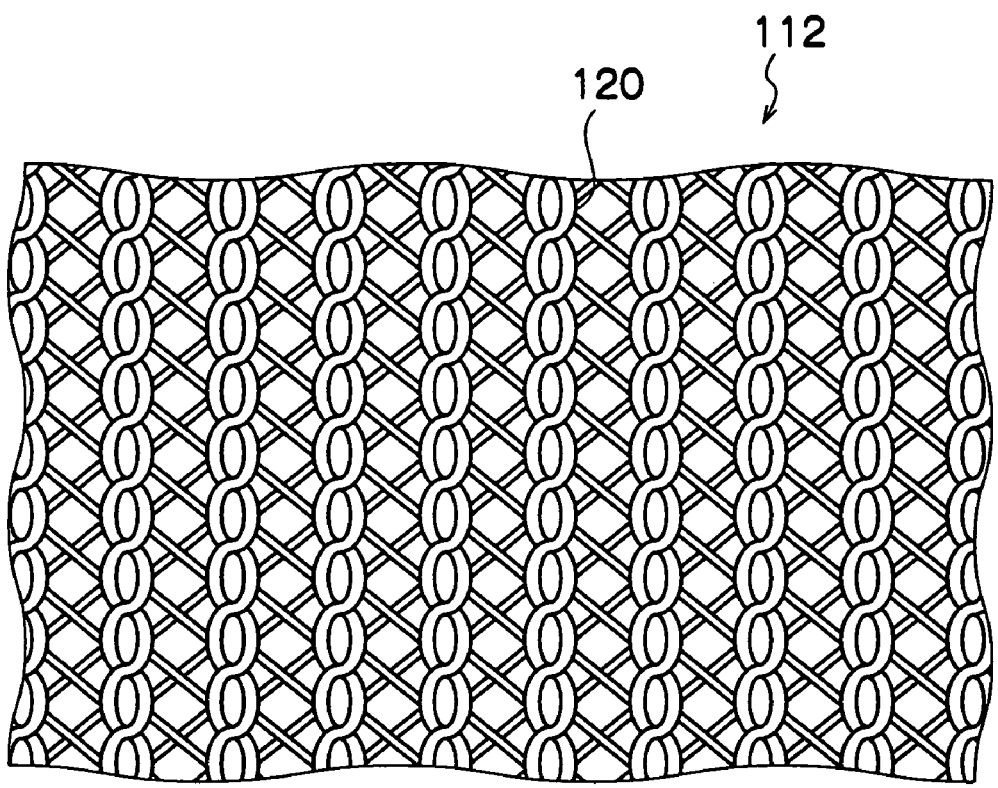
FIG. 10 is a schematic diagram showing an example of one ground knit material used in the three-dimensional solid knit fabric.
Figure 11:
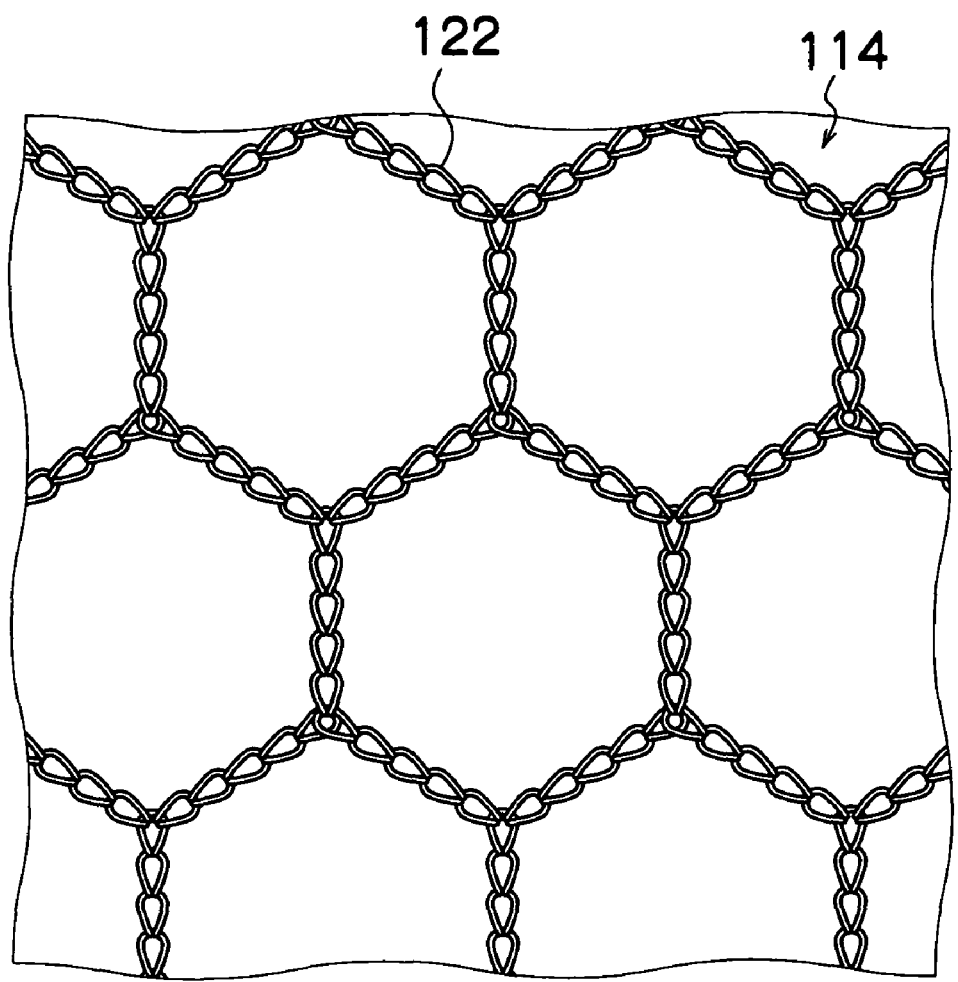
FIG. 11 is a schematic diagram showing an example of another ground knit material used in the three-dimensional solid knit fabric.

For the one ground knit fabric 112, for example, as shown in FIG. 10, there is used a structure which forms a mesh by a flat, knit fabric weave which is continuous in both the wale direction and the course direction, from threads 120 in which short fibers are twisted. Further, for example, the other ground knit fabric 114 forms a honeycomb-shaped mesh from threads 122 in which short fibers are twisted as shown in FIG. 11. The other ground knit fabric 114 is a mesh which is larger than the one ground knit fabric 112. Note that the ground knit fabrics 112, 114 are not limited to a fine weave or a honeycomb shape, and may be structures using mesh-like knit fabric weaves other than these.

As shown in FIG. 9, the connecting threads 116 form the pile portion 118 by being knit-in between the ground knit fabrics 112, 114 so as to hold the one ground knit fabric 112 and the other ground knit fabric 114 at a predetermined interval. In this way, a predetermined rigidity is imparted to the three-dimensional solid knit fabric 110 which is a mesh knit.

The three-dimensional solid knit fabric 110 can provide the required stiffness in accordance with the thickness and the like of the ground threads (the threads 120, 122) which form the ground knit fabrics 112, 114, but it is preferable that the ground threads 120, 122 be selected from those in a range in which the knitting work is not difficult. Further, monofilament threads can be used as the ground threads 122, 122, but in consideration of the touch and the softness of the feel of the surface and the like, multifilament threads or spun threads may be used.

As the connecting threads 116, it is preferable to use monofilament threads, and those whose thickness is in a range of 167 decitex to 1110 decitex are preferable. With multifilament threads, a cushionability that has a good restoring force is not obtained. Further, when the thickness is less than 167 decitex, the stiffness of the three-dimensional solid knit fabric 110 is low, and when the thickness is greater than 1110 decitex, it becomes too hard, and the proper amount of cushionability cannot be obtained.

Namely, by using monofilament threads of 167 decitex to 1110 decitex as the connecting threads 116, the load of the vehicle occupant seated on the seat can be supported by the deformation of the meshes forming the ground knit fabrics 112, 114, and the deformation due to the collapsing or buckling of the connecting threads 116 forming the pile portion 118, and the restoring force of the adjacent connecting threads which impart a spring characteristic to the deformed connecting threads 116, and it is possible to form a soft structure which has a soft spring characteristic and in which concentration of stress does not occur.

Note that recesses and protrusions may be formed at the three-dimensional solid knit fabric 110. Namely, the ground knit fabrics 112, 114 may be fabrics which are knit such that recesses and projections arise at the surfaces thereof. When recesses and projections are formed, spring elements which are substantially arch-shaped in cross-section can be formed at the ground knit fabrics 112, 114. Therefore, an even softer spring characteristic can be imparted, and a structure having elastic compliance which is substantially equivalent to or greater than the elastic compliance of muscles can be easily formed. Note that the elastic compliance is calculated by (deflection amount)/(average pressure value of surface of contact).

The raw materials of the ground threads 120, 122 and the connecting threads 116 are not particularly limited, and may be, for example, synthetic fibers or regenerated fibers such as polypropylene, polyester, polyamide, polyacrylonitrile, rayon, or the like, or natural fibers such as wool, silk, cotton, or the like. These raw materials may be used singly, or may be used together in an arbitrary combination. They are preferably a thermoplastic polyester type fiber exemplified by polyethylene terephthalate (PET), polybutylene terephthalate (PBT) and the like, or a polyolefin type fiber exemplified by nylon 6, nylon 66 and the like, or a fiber combining two or more types of these fibers.

Further, the thread shapes of the ground threads 120, 122 and the connecting threads 116 also are not limited to the above description, and threads of round cross-sections or threads of irregularly-shaped cross-sections or the like may be used.

The pile weave of the pile portion 118, which is the way of arranging the connecting threads 116 forming the pile portion 118, can be classified into the types shown in FIG. 12A through FIG. 12E, when expressed in the state of viewing, from the side surface, the connecting threads 116 which connect the respective ground knit fabrics 112, 114.

FIG. 12A and FIG. 12B are straight types in which the connecting threads 116 are knit-in substantially perpendicularly between the ground knit fabrics 112, 114. Thereamong, FIG. 12A is a structure which is knit straight in figure-eights. FIG. 12B is a structure which is knit simply straight.

Further, FIG. 12C, FIG. 12D, and FIG. 12E show cross types in which the connecting threads 116 are knit so as to intersect midway along, between the ground knit fabrics 112, 114. Thereamong, FIG. 12C is a structure in which the connecting threads 116 are crossed in figure-eights. FIG. 12D is a structure in which the connecting threads 116 are merely crossed. Further, FIG. 12E is a structure in which the connecting threads 116 are gathered together two-by-two and crossed (double-crossed).

Note that, as shown in FIG. 12C through FIG. 12E, when the connecting threads 116 intersect one another and are disposed obliquely, as compared with forms (see FIG. 12A, FIG. 12B) in which the connecting threads 116 are disposed substantially perpendicularly between the ground knit fabrics 112, 114, there is the advantage that a soft spring characteristic having a large compression rate can be imparted while maintaining sufficient restoring force by the buckling strength of the respective connecting threads 116.

At the base seat 40, the surface layer seat 42, the cushion material 24, the support cushion 54, and the net cushions 82 which use the three-dimensional solid knit fabric 110 having such a mesh structure, the spring property is small, the damping ratio is high, deformation following the physique of the vehicle occupant occurs easily, and it is easier to fit.

Note that the above-described structures of the three-dimensional solid knit fabric 110 are examples, and, for example, three-dimensional solid knit fabrics having various types of stitch structures, such as, for example, stitch structures in which convex portions or concave portions, or ribs or the like are formed in the surface, or the like, can be used at the base seat 40 and the surface layer seat 42. Further, three-dimensional solid knit fabrics of different stitch structures may be used in accordance with the application and the function.

Next, operation of the present embodiment will be described.

In the vehicle seat 10 having the above-described structure, when a person sits down, at the seat cushion 18, mainly the base seat 40 (the helical tension springs 46) support the weight of the seated person, and the surface layer seat 42 supports a portion of the weight of the seated person. Concretely, as a person sits down, the base seat 40 is pushed downward as the surface layer seat 42 deflects downward while extending mainly in the left-right direction. The base seat 40 extends and stretches the respective helical tension springs 46 while rotating them around the region of being anchored to the rear frame 34, and deflects downward (sinks-in) while suppressing a rise in tension. In this way, beneath the ischial tuberosities where it is easy for the weight of the seated person to concentrate, the body pressure is dispersed by the zero spring characteristic, and a good posture of the seated person, whose body sides are supported at the tension lines formed by the left and right helical tension springs 46, is maintained. Further, an elastic dam is formed in front of the region beneath the ischial tuberosities. The buttocks of the seated person are effectively prevented from sliding due to this elastic dam and the aforementioned anchor effect due to the zero spring characteristic. Moreover, at the seat back 22, the upper body of the seated person is supported by proper supporting pressures at the respective portions thereof.

Therefore, in the vehicle seat 10, both maintaining of posture by the body side supports and the elastic dam such that the muscles of the seated person are not used, and dispersing of body pressure due to the zero spring characteristic at the low-rigidity plane, are achieved. Because an increase in tension of the base seat 40 accompanying a person sitting down is suppressed, a high damping ratio is obtained at the seat cushion 18, and sufficient restoring force is imparted by the plural helical tension springs 46. In this way, the vibration/shock absorbing ability at the seat cushion 18 is good. For these reasons, the build-up of fatigue accompanying sitting over a long period of time is suppressed at the vehicle seat 10. In particular, at the seat cushion 18, the cushion material 20 is structured so as to include the base seat 40 and the surface layer seat 42 which are the three-dimensional solid knit fabric 110. The rear end of the base seat 40 is elastically connected to the rear end of the frame 14 for the sitting portion via the helical tension springs 46. Therefore, movement of the coccyx accompanying the breathing of the seated person is not impeded (i.e., the seat cushion 18 follows minute movements of the coccyx with hardly any resistance force at all arising).

At the seat cushion 18, the spring constants of the helical tension springs 50, 52 are set such that the auxiliary vibration system, whose mass element is the femoral region of the seated person, functions as a dynamic vibration absorber with respect to up-down vibrations of the main vibration system whose mass element is the upper body including the head portion. Therefore, in a case in which vibrations are inputted from the vehicle body as the automobile in which the vehicle seat 10 is installed travels, mainly the femoral region vibrates in the up-down direction (the direction of rotation of the hip joint J), and up-down direction vibrations of the upper body are suppressed. In this way, up-down vibrations of the head portion positioned at the top portion of the upper body of the seated person are suppressed, and build-up of fatigue of the seated person is suppressed. On the other hand, because the vibrations which accompany traveling are mainly transferred to the femoral region, the seated person (and the driver of the automobile in particular) can perceive the traveling conditions, such as the state of the road surface or the like, due to the transfer of force (vibrations) from the seat cushion 18.

Further, at the seat back 22, the lumbar support cushion 80 is elastically supported at the frame 16 for the back portion via the helical tension springs 90. Therefore, the support rigidity of the portion of the back rest 22A which portion supports the lumbar region, increases without making the damping ratio small. In this way, it is confirmed that the front-back direction vibrations (amplitude) of the head portion of the seated person are suppressed.

Figure 8:
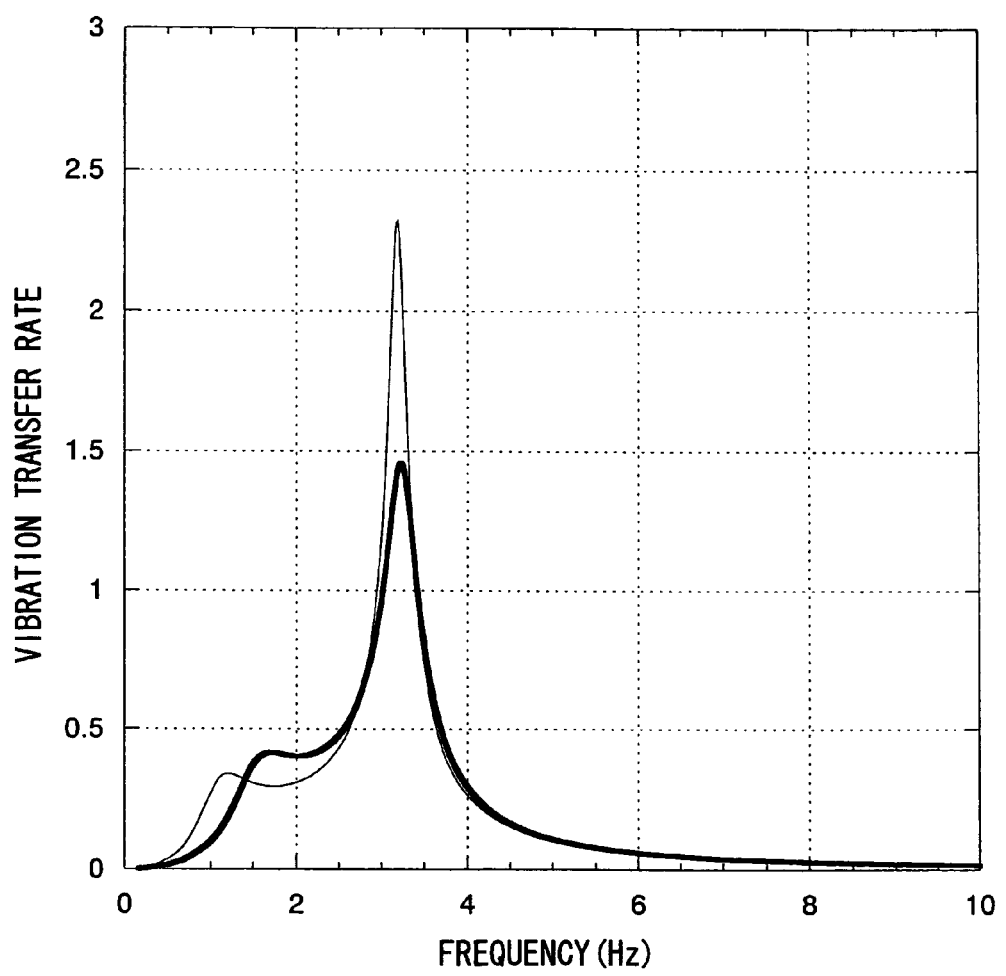
FIG. 8 is a graph showing the results of numerical analysis which analyze a transfer characteristic of front-back vibration of the head portion of a seated person, based on the vibration model of FIG. 7.

FIG. 8 shows the results of numerical analysis analyzing, by using the model of FIG. 7, the vibration transfer characteristic of front-back direction vibrations of the head portion of the seated person in a case in which front-back direction exciting force (F=Pcosωt) is applied to the mass M1. From this drawing, it is confirmed that, at the vehicle seat 10 provided with the lumbar support cushion 80, the peak of the front-back direction vibration transfer rate of the head portion is markedly lowered as compared with the comparative example which does not have the lumbar support cushion 80. Here, analysis is carried out by using, as the model of the seated person, M1=78.89 kg, M2=23.50 kg, length L of arm L=0.6663 m, and spring constant Kθ of the waist=3000 Nm/rad, and the peak of the exciting force being P=1003.422 N, and the spring constant K4 of the spring K4 in the case in which the lumbar support cushion 80 is provided being K4=1000 N/m, and the spring constant K4 of the spring K4 in the case in which the lumbar support cushion 80 is not provided being K4=500 N/m, and the damping ratio in each of these cases being constant at 0.3.

From the results of this analysis, it is confirmed that the front-back direction natural frequency of the head portion of the seated person is hardly affected at all even of the spring constant K4 increases while the damping ratio of the back rest 22A is maintained. Namely, by providing the lumbar support cushion 80, a structure is realized in which only the peak of the vibration transfer rate is lowered without hardly any effect at all on the frequency characteristic which is set by stretching the cushion material 24 for the back portion at the frame 16 for the back portion. Moreover, in the structure in which the cushion material 24 for the back portion is stretched at the frame 16 for the back portion, a structure is realized in which front-back vibration is hardly transferred at all to the head portion of the seated person (the vibration transfer rate is substantially 0) in the low frequency region of less than or equal to 1 Hz and in the high frequency region of greater than or equal to 5 Hz. It is confirmed that this characteristic is maintained even in a structure in which the lumbar support cushion 80 is provided.

Although the lumbar support cushion 80 increases the partial support rigidity supporting the lumbar region at the back rest 22A due to the tension of the helical tension springs 90, the lumbar support cushion 80 does not crush the muscles of the lumbar region due to deformation of the lumbar support cushion 80 which is the three-dimensional solid knit fabric 110. Therefore, it is possible to suppress pain from arising at the lumbar region of the seated person.

In this way, at the present vehicle seat 10, it is possible to effectively suppress up-down direction and front-back direction vibrations of the head portion of the seated person. In particular, at the vehicle seat 10, due to the anchor effect caused by the zero spring characteristic of the base seat 40, and the formation of the elastic dam and the body side supports caused by the three-dimensional tension field, a hammock sensation, which is the phenomenon of forward sliding and the seated posture being unstable, is eliminated, and a flat sensation with respect to rolling and the left-right direction inputs is obtained. Further, due to the synergy with the above-described suppression of vibration of the head portion, fatigue of the seated person accompanying sitting over a long period of time can be reduced.

Note that the above-described embodiment is a preferable example provided with both the supporter 48 which serves as a support member and the lumbar support cushion 80 which serves as a support member for the back portion. However, the present invention is not limited to the same, and the vehicle seat 10 may be structured, for example, so as to have only either one of the supporter 48 and the lumbar support cushion 80.

Further, the above embodiment describes an example in which the supporter 48 and the lumbar support cushion 80 are supported at the seat frame 12 via the helical tension springs which are the elastic members. However, the present invention is not limited to the same. The supporter 48 and the lumbar support cushion 80 may be supported at the seat frame 12 via any elastic member. Or, the supporter 48 and the lumbar support cushion 80, which themselves have predetermined elasticities, may be directly supported at the seat frame 12.

Moreover, the above embodiment is an example in which the elastic members which connect the rear end of the base seat 40 to the frame 14 for the sitting portion are the helical tension springs 46. However, the present invention is not limited to the same. For example, the rear end of the base seat 40 may be connected to the other end sides of arms whose one end sides are connected to the frame via a torsion bar which is long in the transverse direction.

Although the above-described embodiment shows an example in which the base seat 40 is a three-dimensional solid knit fabric, the present invention is not limited to the same, and the base seat 40 may be structured, for example, by a cloth material which is difficult to extend in the direction of tension as compared with a three-dimensional solid knit fabric. Further, the cushion material 20 is not limited to a structure provided with the urethane cushion 44, and may be a two-layer structure formed by the base seat 40 and the surface layer seat 42, or a three-dimensional solid knit fabric may be provided as an intermediate layer.

The above-described embodiment is a structure which applies the present invention to a vehicle seat 10, but the present invention is not limited to the same. The present invention can be applied to various types of seats such as, for example, seats for means of transport such as train cars, ships, airplanes, and the like, or chairs for offices, chairs for furniture, or the like.

What is claimed is:

1. A seat comprising:
    a frame for a sitting portion of a person, the frame comprising a front frame member, a rear frame member, and opposing left and right side frame members extending between the front and rear frame members;
    a seat material disposed between the front and rear frame members, and between the side frame members, the seat material comprising a front end side that is fixed to the front frame member, a rear end side that is connected to the rear frame member, and side edge portions disposed within the side frame members, wherein a width of the seat material is smaller than a distance between the right side frame member and the left side frame member such that the side edge portions of the seat material are disposed within the frame to form gaps between the side edge portions of the seat material and the right and left side frame members, respectively, and the rear end side of the seat material is disposed within the front frame member and the rear frame member, and at the vicinity of the rear frame member such that at least one helical spring is disposed within a gap formed between the rear end side of the seat material and the rear frame member; and connecting the rear end side of the seat material to the rear frame member; and
    a support member disposed at a lower side of the seat material, and elastically supported at the frame for a sitting portion so as to support a femoral region of a seated person.

2. The seat of claim 1, wherein the support member comprises a tension structure which supports load which is applied from a direction intersecting a direction of tension of the tension structure.

3. The seat of claim 2, wherein the support member comprises a two-dimensional cloth material.

4. The seat of claim 1, wherein a left end side of the support member is connected to the left side frame member via an elastic member, and a right end side of the support member is connected to the right side frame member via an elastic member.

5. The seat of claim 4, wherein a front portion and a rear portion of the left end side of the support member are independently connected to the left side frame member via elastic members, and a front portion and a rear portion of the right end side of the support member are independently connected to the right side frame member via elastic members.

6. The seat of claim 5, wherein spring constants of the elastic members which connect the rear portion of the left end side and the rear portion of the right end side of the support member to the side frames corresponding thereto, are larger than spring constants of the elastic members which connect the front portion of the left end side and the front portion of the right end side of the support member to the side frames corresponding thereto.

7. The seat of claim 1, further comprising:
    a frame for a back portion having a pair of left and right side frames for a back portion;
    a cushion material for a back portion stretched at the frame for a back portion; and
    a support member for a back portion which is elastically supported at the left and right side frames for a back portion between lower portions of the left and right side frames for a back portion, and which increases support rigidity of a portion supporting a lumbar region of a seated person.

8. The seat of claim 1, wherein the seat material comprises two layers of a three-dimensional solid knit fabric.

9. The seat of claim 8, wherein the seat material comprises a cushion member sandwiched between the two layers of the three-dimensional solid knit fabric.

10. The seat of claim 1, wherein the seat material is a fabric seat material.

11. A seat comprising:
    a frame for a back portion having a pair of left and right side frames for a back portion, and a lower frame for a back portion disposed at lower end portions of the side frames;
    a cushion material for a back portion stretched at the frame for a back portion; and
    a support member for a back portion which is elastically supported by one or more helical springs at the left and right side frames for a back portion between lower portions of the left and right side frames for a back portion and in the vicinity of the lower frame, the support member for increasing rigidity of a portion supporting a lumbar region of a seated person, wherein the support member for a back portion comprises an upper side member and a lower side member disposed below the upper side member, the lower side member and the upper side member being separate members and each being expandable/contractable and the upper side member and the lower side member being connected such that a lower portion of the upper side member and an upper portion of the lower side member are connected, and wherein a substantial bow shape which is convex toward a front direction of the seat is formed by both of the upper side member and the lower side member which are connected such that a connection-portion at which the lower portion of the upper side member and the upper portion of the lower side member are connected projects toward the front side of the seat.

12. The seat of claim 11, wherein the support member for a back portion comprises two layers of a three-dimensional solid knit fabric.

13. The seat of claim 12, wherein the support member for a back portion comprises a cushion member sandwiched between the two layers of the three-dimensional solid knit fabric.

14. The seat of claim 11, wherein the upper side member and the lower side member each includes a bag structure.

15. The seat of claim 11, wherein the support member for a back portion is disposed within the left and right side frames for a back portion to define gaps therebetween respectively, and is elastically supported by a left side elastic member and a right side elastic member respectively at the left and right side frames for a back portion.

16. The seat of claim 11, wherein gaps are respectively formed between the left side frame for a back portion and a left edge of the support member for a back portion and between the right side frame for a back portion and a right edge of the support member for a back portion, and the helical springs are respectively disposed at the gaps.

17. The seat of claim 11, wherein a connecting bag includes an upper side bag portion and a lower side bag portion, and the upper side member and the lower side member are accommodated respectively in the upper side bag portion and the lower side bag portion.

18. A seat comprising:

a frame for a sitting portion of a person, the frame comprising a front frame member, a rear frame member, and opposing left and right side frame members extending between the front and rear frame members;

a seat material disposed between the front and rear frame members, and between the side frame members, the seat material comprising a front end side that is fixed to the front frame member, a rear end side that is connected to the rear frame member, and left and right side edge portions disposed within the side frame members;

at least one helical spring disposed between and connecting the rear end side of the seat material to the rear frame member;

a support member disposed at a lower side of the seat material, and elastically supported at the frame for a sitting portion so as to support a femoral region of a seated person;

a width of the seat material is smaller than a distance between the right side frame member and the left side frame member such that the right and left side edge portions of the seat material are disposed within the frame to form right and left gaps between the right and left side edge portions of the seat material and the right and left side frame members, respectively;

the rear end side of the seat material is disposed within the front frame member and the rear frame member, and is disposed at the vicinity of the rear frame member such that the helical spring is disposed within a rear gap formed between the rear end side of the seat material and the rear frame member;

the front end side of the seat material is fixed to the front frame member;

the helical spring is disposed only at the rear gap such that the rear end side of the seat material is movable with respect to the rear frame member in front-rear direction and is rotatable downwardly;

a support member-rear gap, a support member-right gap, and a support member-left gap are respectively formed between a rear end side of the support member and the rear frame member, a right end side of the support member and the right frame member, a left end side of the support member and the left frame member; and support-helical springs connecting the support member and the frame, and disposed only at the support member-right gap and the support member-left gap.

* * * * *